United States Patent
Shimazu et al.

(10) Patent No.: US 8,028,997 B2
(45) Date of Patent: Oct. 4, 2011

(54) RESIN SEAL RING AND MANUFACTURING METHOD

(75) Inventors: Eiichirou Shimazu, Mie (JP); Keitarou Emura, Mie (JP); Masaki Egami, Mie (JP)

(73) Assignee: NTN Corporation, Osaka (JP)

( * ) Notice: Subject to any disclaimer, the term of this patent is extended or adjusted under 35 U.S.C. 154(b) by 26 days.

(21) Appl. No.: 12/455,611

(22) Filed: Jun. 4, 2009

(65) Prior Publication Data

US 2009/0243224 A1    Oct. 1, 2009

Related U.S. Application Data

(62) Division of application No. 10/856,398, filed on May 27, 2004, now Pat. No. 7,559,555.

(30) Foreign Application Priority Data

May 29, 2003  (JP) ................ P2003-152219
Dec. 18, 2003 (JP) ................ P2003-420450

(51) Int. Cl.
  *B60T 11/236*  (2006.01)
  *B29B 7/00*    (2006.01)
(52) U.S. Cl. .................... 277/434; 264/328.9

(58) Field of Classification Search .............. 277/434; 264/328.9, 328.12, 328.1, 108
See application file for complete search history.

(56) References Cited

U.S. PATENT DOCUMENTS

| 5,628,519 | A | * | 5/1997 | Kakehi .................. 277/434 |
| 5,664,536 | A |   | 9/1997 | Bigsby |
| 6,045,135 | A |   | 4/2000 | Feistel |
| 6,631,908 | B2 |  | 10/2003 | Mittler et al. |

FOREIGN PATENT DOCUMENTS

| JP | 56-15437    | 2/1981  |
| JP | 08-233110   | 9/1996  |
| JP | 08-276508   | 10/1996 |
| JP | 09-042455   | 2/1997  |
| JP | 09-094851   | 4/1997  |
| JP | 2001-271928 | 10/2001 |
| JP | 2002-301742 | 10/2002 |

* cited by examiner

*Primary Examiner* — Vishal Patel
(74) *Attorney, Agent, or Firm* — Hedman & Costigan, P.C.; James V. Costigan

(57) ABSTRACT

The present invention provides a seal ring which can be prevented from being broken by an expansion and a shock applied thereto when the seal ring is fitted on a rotary shaft and does not have a configurative disadvantage such as a burr. Therefore no post-processing is required. The present invention also provides materials of the seal ring and a method of manufacturing the seal ring. The seal ring is made of resin and having two abutments confronting each other and a gate mark formed in an injection molding operation.

6 Claims, 8 Drawing Sheets

RESIN SEAL RING AND MANUFACTURING METHOD

This application is a divisional application of Ser. No. 10/856,398, filed May 27, 2004, which claims the priority of Japanese Applications Serial Nos. P2003-152219, filed May 29, 2003 and P2003-420450, filed Dec. 18, 2003.

BACKGROUND OF THE INVENTION

The present invention relates to a resin seal ring by injection molding, which is used for a hydraulic mechanism of an automatic transmission (AT), a continuously variable transmission (CVT) and a method of manufacturing the seal ring. More particularly, the present invention relates to a small seal ring, having an inner diameter not more than 20 mm, which can be incorporated in a mating shaft with a high mountability and a method of manufacturing the seal ring.

Nowadays an oil-sealing ring for sealing a hydraulic oil used much in the automatic transmission and the continuously variable transmission is formed by injection-molding a mixture of polyether ketone resin, a reinforcing component such as carbon fiber, a solid lubricant such as polytetrafluoroethylene (PTFE) resin, and the like. An abutment portion consisting of adjacent abutments is formed on the oil-sealing ring by cutting a portion thereof. A gate into which resin is injected is formed at a portion (mainly on inner peripheral surface) opposed to the abutment portion disposed at the center of the seal ring. The seal ring is fitted on a rotary shaft by expanding the abutments with a jig.

A known method of fitting the resin seal ring on a mating shaft (hereinafter referred to as merely shaft) is described below with reference to FIG. 4.

A resin seal ring 1 is fitted on a mating shaft 11 by using a tapered jig 4 as follows: After the seal ring 1 is fitted on the tapered jig 4 from a small-diameter side 4a thereof to a large-diameter side 4b thereof, the shaft 11 is inserted into the tapered jig 4. Thereafter the seal ring 1 is dropped into a seal ring-mounting groove 12 of the shaft 11 from the large-diameter side 4b of the tapered jig 4.

In fitting the seal ring ion the shaft 11, a strain is generated in the neighborhood of the position of the seal ring opposed to the abutment portion and a stress concentration occurs. Therefore when the seal ring 1 has a gate for injection molding use or a weld portion having a low mechanical strength at the position opposed to the abutment portion, the seal ring may be broken at the position opposed to the abutment portion. Another problem of the seal ring having the gate for the injection molding use at the position opposed to the abutment portion is that the orientation of reinforcing fibers such as carbon fibers disposed in the vicinity of the gate is parallel with the direction of a strain-caused crack. Thus it is impossible to obtain a sufficient reinforcing effect in the neighborhood of the gate. Therefore when the seal ring is fitted on the shaft, the seal ring is broken at the gate mark. In recent years, there is a tendency for the seal ring to be formed compactly because a hydraulic mechanism is becoming compact. The seal ring having an inner diameter of 20 mm or less is easily broken even though the seal ring is composed of a comparatively flexible material. Polyether ketone resin is known as a crystalline thermoplastic resin excellent in its heat resistance, mechanical property, self-lubricant property, and flexibility. The above-described problem of breakage is caused by deterioration of flexibility of the composition of the seal ring containing an inorganic reinforcing material such as carbon fibers which impart a demanded high wear resistance to the seal ring.

As a means for solving the above-described problems, resin is injected into a portion in the vicinity of one end of abutments of the seal ring disclosed in Japanese Patent Application Laid-Open No. 8-233110. In the method disclosed in Japanese Patent No. 3299419, the gate position is spaced at a certain interval from the position opposed to the abutment portion to prevent breakage of the seal ring.

However, the step cut portion is complicated in its configuration and demanded to have high precision to keep oil-sealing performance. Thus a telescopic construction is adopted for the step cut portion. Therefore a parting line which may cause generation of a burr is present on the periphery of the step cut portion. In the seal ring disclosed in Japanese Patent Application Laid-Open No. 8-233110, the gate to which a highest pressure is applied is disposed on the periphery of the step cut portion when molding operation is performed. Thus the burrs tend to be generated there.

In the seal ring disclosed in Japanese Patent No. 3299419, after the seal ring having the gate formed at a position spaced from the position opposed to the abutments, the abutment portion is formed by a mechanical processing as the means for avoiding breakage of the seal ring when it is fitted on the rotary shaft. However, the seal ring has the weld portion having a low strength. If the inner diameter of the seal ring is not more than 20 mm, the weld portion is liable to be broken by a shock applied to the seal ring when it is fitted on the rotary shaft. Supposing that the angle of the abutment portion of the seal ring is 180 degrees and the angle of the portion opposed to the abutment portion is 0 degree, the gate is disposed in the range of 45 to 90 degrees. However, the gate is not spaced sufficiently from the position where a large strain is generated when the seal ring is fitted on the rotary shaft. Thus the seal ring does not have any effect of improving fittability of the seal ring on the rotary shaft or has deteriorated fittability.

SUMMARY OF THE INVENTION

The present invention has been made to solve the above-described problems. Therefore, it is an object of the present invention to provide a resin seal ring which is flexible to such an extent that the seal ring is not broken when an expansion and a shock is applied to the seal ring in fitting the seal ring on a rotary shaft. It is another object of the present invention to provide a resin seal ring not having a weld portion that is generated in a molding operation. It is still another object of the present invention to provide a resin seal ring not having configurative disadvantages that a burr is formed and that post-processing is required. It is still another object of the present invention to provide a method of manufacturing the seal ring.

To achieve the object, the present invention provides a resin seal ring having two abutments confronting each other. When an inner diameter of the seal ring is expanded, with the seal ring being supported by three points consisting of the two abutments and by a position opposed to the two abutments, a thickness of a predetermined region in which a strain is generated in a higher magnitude than a strain generated in the position opposed to the two abutments is set smaller than that of the position opposed to the two abutments, with an outer diameter of the seal ring maintained.

Because the seal ring is thinned with the outer diameter of the seal ring maintained, i.e., because the seal ring is thinned by expanding the inner diameter of the seal ring, the sealing performance of the seal ring does not deteriorate. The amount of a strain generated in the thin portion decreases. Consequently it is possible to increase the expansion amount of the inner diameter of the seal ring.

Since the thin portion is formed, the energy stored in the seal ring decreases when the seal ring is expanded. Consequently a smaller impact force is applied to the seal ring when the seal ring is fitted on a shaft. Thereby it is possible to prevent an impact force from breaking the seal ring.

The resin seal ring of the present invention includes abutments confronting each other and a mark of a gate formed in an injection molding operation at a position spaced at a certain interval from a position opposed to the abutments abutting each other. The gate mark is present in a range of not less than 90 degrees nor more than 180 degrees in a central angle of the seal ring with respect to the position opposed to the abutments, supposing that an angle of the position opposed to the abutments is 0 degree.

The method of manufacturing a resin seal ring having abutments confronting each other, including a molding preparing step, an injection molding step, and a molded product take-out step. The injection molding step is performed by using a die having a resin reservoir provided through an inlet portion thereof at a position between a gate, for injection molding use, which is spaced at a given interval from a position opposed to an abutment portion and one abutment nearer to the gate than another abutment in a circumferential distance of the seal ring. The inlet portion of the resin reservoir is configured so that a resistance to a flow of a resin into the resin reservoir is higher than a resistance to a flow of the resin into a sealing portion in an injection molding operation; and a size of the resin reservoir is so set that the resin reservoir and the sealing portion are charged simultaneously and completely with the resin in the injection molding operation.

The gate is spaced by not less than 90 degrees from the position opposed to the abutment portion. The size of the resin reservoir and the configuration of the inlet portion of the resin reservoir are adjusted in such a way that the resin reservoir and the sealing portion are charged simultaneously and completely with resin or in such a way that when the sealing portion is completely charged with the resin, the resin reservoir portion is incompletely charged therewith. Therefore in the seal ring of the present invention, it is possible to suppress generation of a burr formed by over-charging of resin and generation of a molding sink that is generated by shortage of a follow-up pressure. Further the seal ring does not have a weld portion having a low strength. Thus the seal ring is excellent in its mechanical strength and dimensional precision. Therefore the seal ring can be prevented from being broken when it is expanded to fit it on a shaft.

The resin seal ring having abutments confronting each other is formed by molding a resin composition. The resin composition contains a polyether ketone resin and a spherical carbon material, containing carbon as a main constituent element thereof, which is added to the polyether ketone resin.

Owing to the use of the resin composition containing the polyether ketone resin and a predetermined amount of the spherical carbon material added thereto, the seal ring of the present invention has an excellent flexibility of the polyether ketone resin and in addition a low friction coefficient and an excellent wear resistance.

DETAILED DESCRIPTION OF THE PREFERRED EMBODIMENTS

Figure 4:
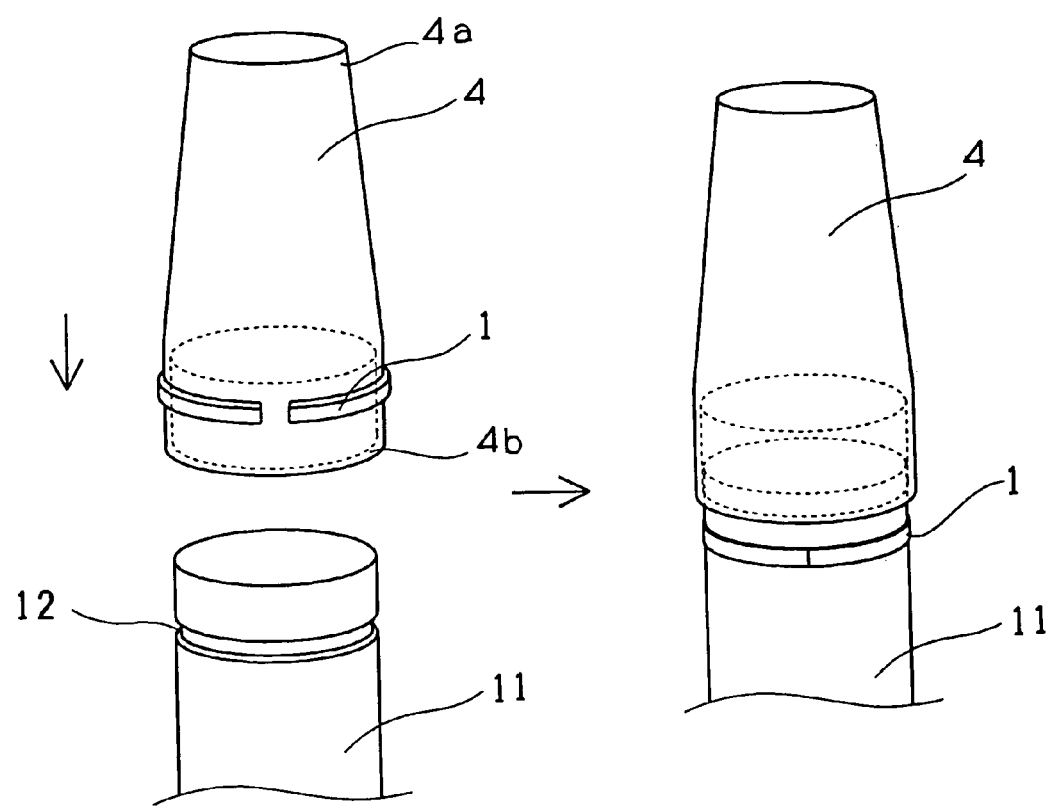
FIG. 4 is a squint-eyed view showing a method of fitting the seal ring on a mating shaft.

By using a finite element method, the present inventors have analyzed the construction of the seal ring by examining the amount of a strain generated in the seal ring in fitting the seal ring on a mating shaft (hereinafter referred to as merely shaft) by expanding the inner diameter of the resin seal ring having a constant thickness, by using a tapered jig shown in FIG. 4. As result, they have found that when the tapered jig is used, the seal ring is supported on the peripheral surface of the tapered jig at three points, namely, two abutments thereof and a position thereof opposed to the abutments. They have also found that the magnitude of a strain generated in a region is larger than that of a strain generated at the position opposed to the abutments where a gate is disposed. Therefore by making the thickness of the region smaller than that of the gate, the region is expanded when a force is applied to the seal ring. Thereby it is possible to prevent the seal ring from being broken at the gate formed at the central portion of the seal ring.

As a result of experiments based on the analysis of the construction of the seal ring, the present inventors have found the following fact: Supposing that the angle of the abutment portion of the seal ring consisting of two abutments is 180 degrees and that the angle of the position opposed to the abutment portion is 0 degree, it is possible to prevent the seal ring from being broken at the gate formed at the central portion of the seal ring by making the thickness of a predetermined region of the seal ring in the range more than 0 degree and not more than 165 degrees, favorably not less than 5 degrees nor more than 90 degrees, and more favorably not less than 5 degrees nor more than 50 degrees or by making the thickness of a predetermined region of the seal ring having a central angle not less than 20 degrees nor more than 130 degrees smaller than that of the position opposed to the abutment portion. The present invention is based on this knowledge.

Figure 1A:
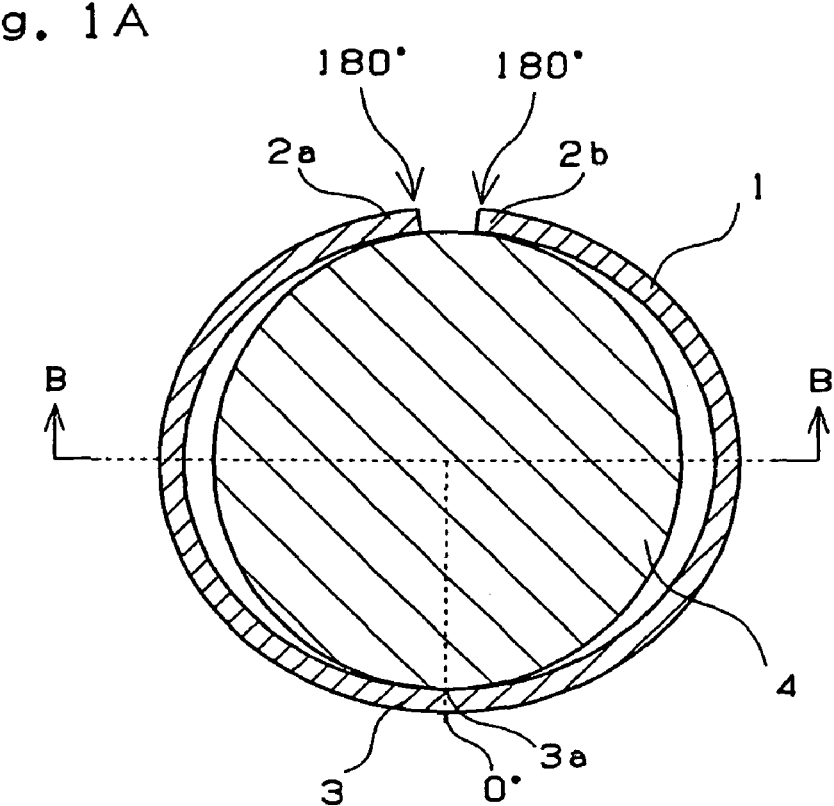
FIG. 1A is a sectional view in a diametrical direction showing a state of a seal ring whose inner diameter is expanded.
Figure 1B:
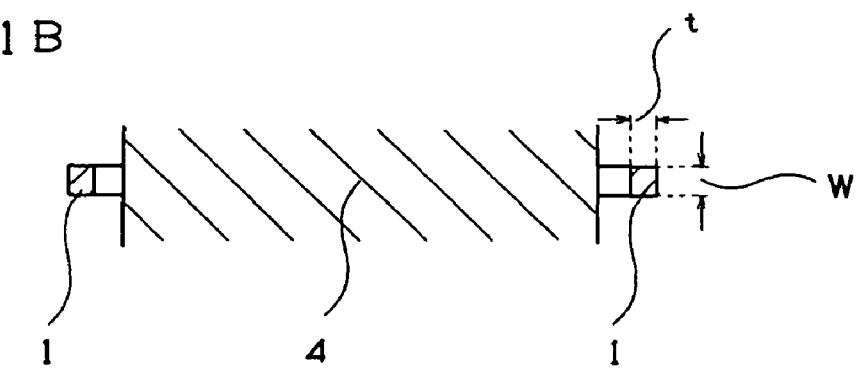
FIG. 1B is a sectional view taken along a line B-B of FIG. 1A.

FIGS. 1A and 1B show the state in which the inner diameter of the seal ring whose thickness and width do not change in its entire circumference is expanded. FIG. 1A is a sectional view in a diametrical direction. FIG. 1B is a sectional view taken along a line B-B of FIG. 1A. The seal ring 1 is supported on the peripheral surface of a tapered jig 4 at three points, namely, at abutments 2a, 2b thereof and a position 3a thereof opposed to the abutments 2a, 2b. The seal ring 1 is and has a constant thickness t and a constant width W throughout the entire circumference thereof as shown in FIG. 1B.

Figure 2:
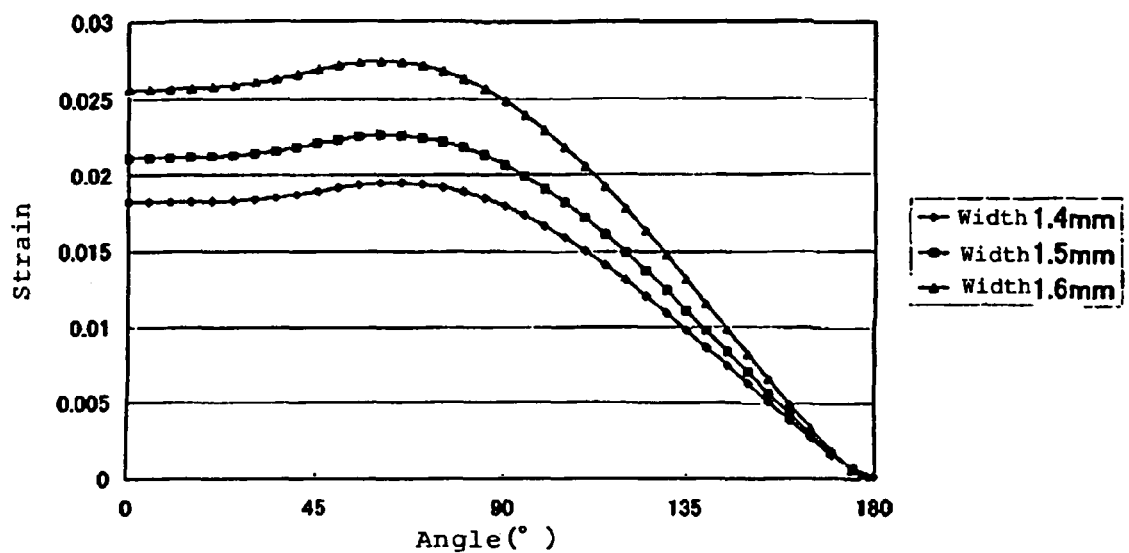
FIG. 2 is a graph showing the magnitude of a strain generated in the seal ring.
Figure 7:
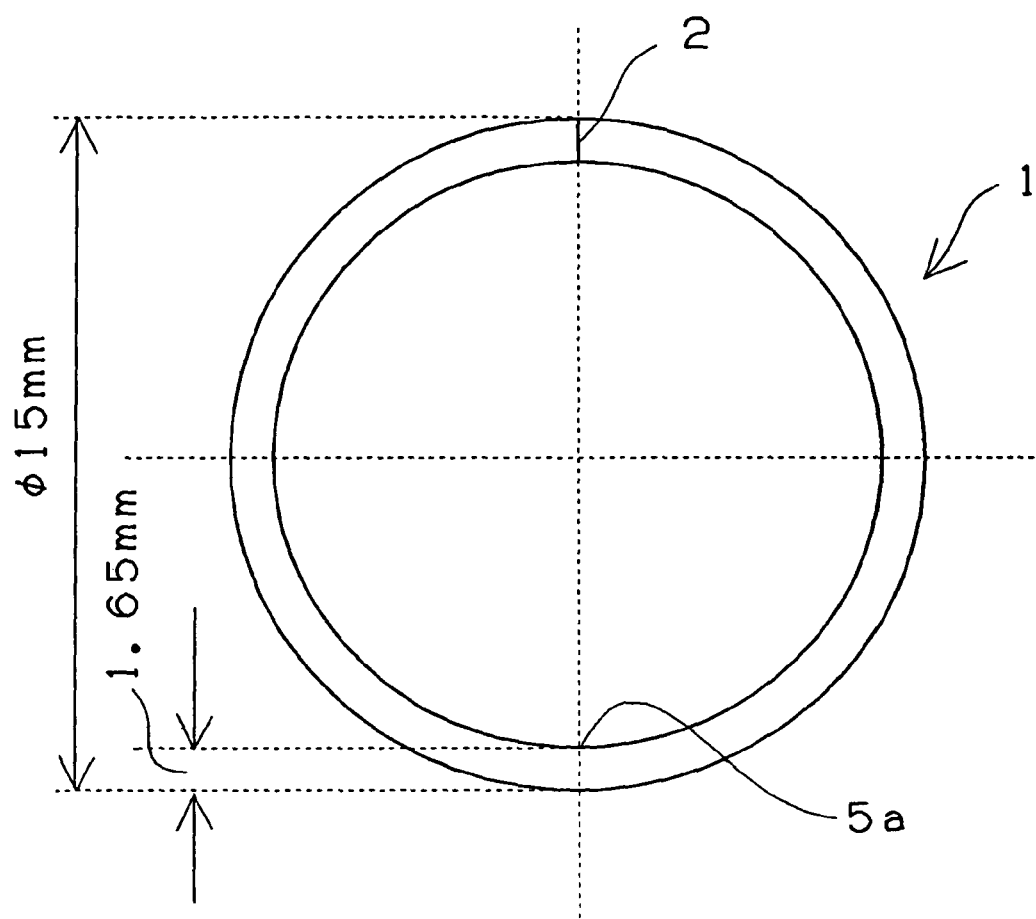
FIG. 7 is a plan view showing one embodiment of the resin seal ring of the present invention.

By using the finite element method, the present inventors analyzed the construction of the seal ring 1 having a configuration shown in FIG. 7 by examining the magnitude of a strain generated therein. To do so, with the seal ring 1 fitted on a tapered jig 4, the abutments 2a, 2b are expanded to a position of the tapered jig 4 at which the diameter was 15.2 mm. The construction of the seal ring 1 was analyzed by setting the width of the seal ring to 1.4 mm, 1.5 mm, and 1.6 mm. FIG. 2 shows the result.

In the abscissa axis of FIG. 2, the angle of an abutment portion, as shown in FIG. 1A, at the time when the abutments 2a, 2b were abutted each other was set to 180 degrees, whereas the angle of the position 3a opposed to the abutments 2a, 2b was set to 0 degree.

The strain is generated to a higher extent gradually from 0 at 180 degrees toward a peak value at 50 to 60 degrees and decreases toward 0 degree. The tendency of the generated strain was approximately almost the same when the width W of the seal ring was changed. The strain is generated symmetrically in a right-to-left direction.

According to the present invention, based on the results, the thickness of a region of the seal ring where the magnitude of the generated strain is higher than that of a strain generated at a position (angle: 0 degree) opposed to the abutment portion is made smaller than the thickness t at the position opposed to the abutment portion. By setting the thickness of the seal ring in this manner, when the inner diameter of the seal ring is expanded by using the tapered jig, the inner diameter of the seal ring is expanded mainly in the thin portion. Therefore it is possible to prevent the seal ring from being broken at the gate formed at the central portion of the seal ring.

Figure 3A:
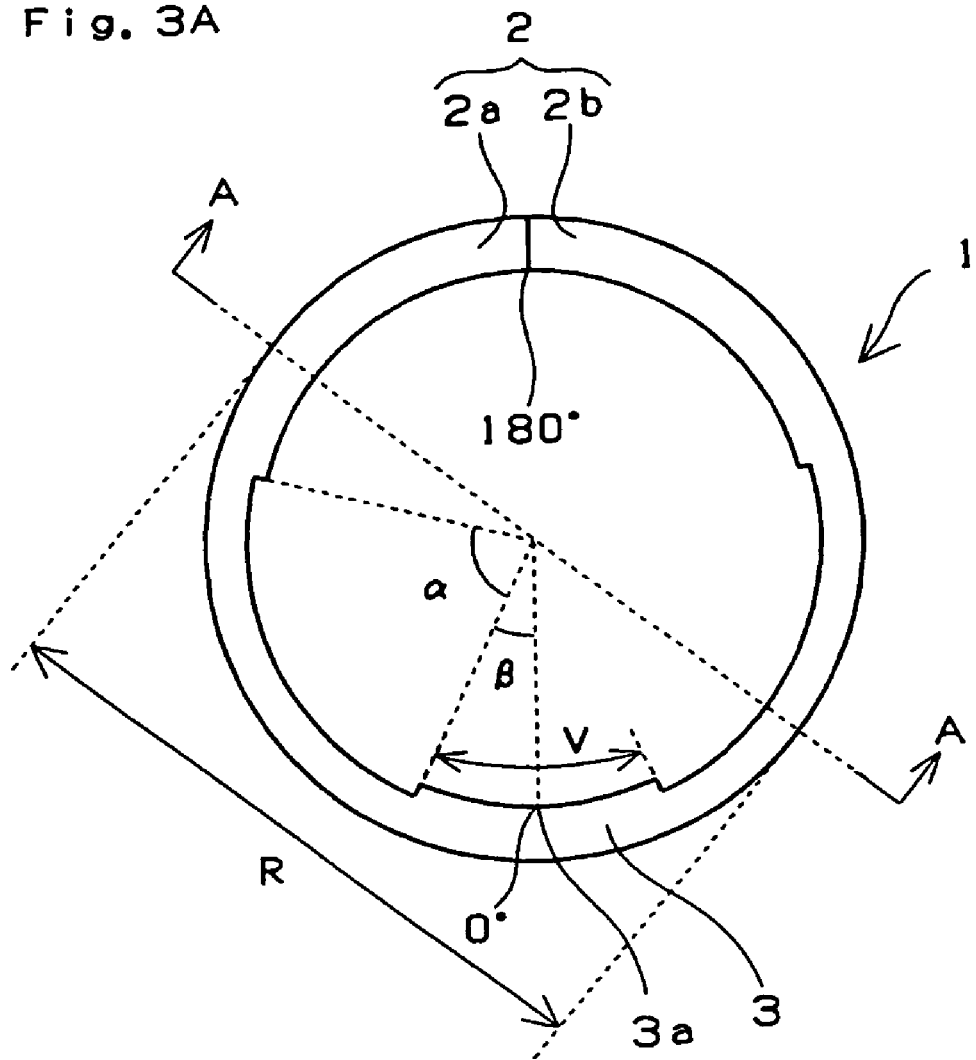
FIG. 3A is a plan view showing an example of a resin seal ring.
Figure 3B:
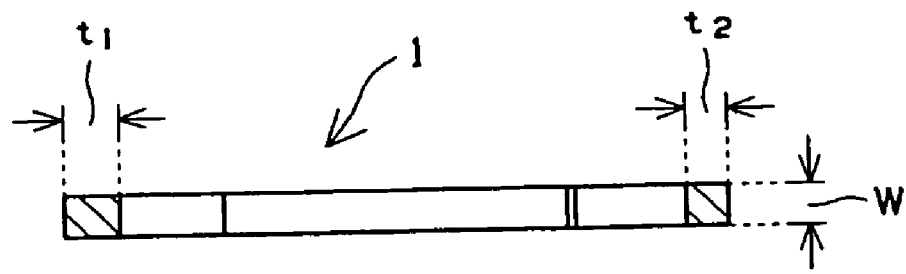
FIG. 3B is a sectional view taken along a line A-A of FIG. 3A.

An embodiment of the seal ring of the present invention is described below with reference to FIG. 3A and FIG. 3B. FIG. 3A is a plan view of the seal ring made of resin. FIG. 3B is a sectional view taken along the line A-A of FIG. 3A.

The seal ring 1 has an abutment portion 2 consisting of abutments 2a, 2b confronting each other. The seal ring 1 rectangular in its sectional configuration has a thickness t and a width W. A gate serving as a resin injection opening is formed at a position 3a opposed to the abutment portion 2. The seal ring 1 is divided into a thick portion $t_1$ and a thin portion $t_2$ formed along the circumference. The thickness of the thick portion $t_1$ is equal to that of the abutment portion 2 and that of the position 3a opposed to the abutment portion 2. The outer diameter R of the seal ring 1 in the thick portion $t_1$ is equal to that in the thin portion $t_2$. Thus the thin portion $t_2$ is thinly formed by cutting off the inner peripheral portion of the seal ring 1. Supposing that the angle of the abutment portion 2 of the seal ring 1 is 180 degrees and the angle of the position 3a opposed to the abutment portion 2 is 0 degree, the region in which the thin portion $t_2$ is formed is set to more than 0 degree and not more than 165 degrees, and favorably in the range 5 degrees nor more than 90 degrees. Because the radial length of the gate is frequently not less than 0.5 mm in injection molding, it is preferable to set the angle of the thin portion $t_2$ to not less than five degrees to hold a circumferential length V for the thick portion where the gate is disposed. If the angle of the thin portion $t_2$ is more than 165 degrees, it is difficult for the seal ring to be supported by the mating shaft.

As the circumferential length V of the thick portion of the gate becomes smaller, it becomes increasingly easy to prevent the seal ring from being broken when the seal ring is fitted on the shaft. Therefore it is preferable to set the angle β of circumference to not more than 30 degrees. If the angle β of circumference is more than 30 degrees, it is impossible to sufficiently prevent the breakage of the seal ring at the gate. It is preferable to set the angle β of circumference to not less than five degrees owing to the presence of the radial length of the gate.

In the above-described angle range, the central angle α of the region in which the thickness of the seal ring is made thin is not less than 20 degrees nor more than 130 degrees. If the central angle α is out of this range, there is a possibility that the relationship between the shaft and seal ring cannot be fixed and that the shaft becomes eccentric from a cylinder.

As a preferable example of the angle for making the thickness t of the seal ring smaller than that of the portion 3 opposed to the abutment portion in the seal ring shown in FIGS. 3A and 3B, the angle β of circumference is in the range of 5 to 30 degrees, and the central angle α is not less than 20 degrees nor more than 85 degrees.

The thickness of the region of the seal ring having the smaller thickness is 60 to 95% of the thickness of the abutment portion or the thickness of the portion opposed to the abutment portion. If the thickness of the region of the seal ring having the smaller thickness is less than 60% of the thickness of the abutment portion or the portion opposed to the abutment portion, there is a fear that an abnormal friction occurs owing to an increase of a pressure applied to the portion of contact between the surface of the seal ring and the ring groove of the shaft and that the oil-sealing performance of the seal ring deteriorates.

It is preferable that the region of the seal ring having the smaller thickness is formed symmetrically in the right-to-left direction with respect to the position opposed to the abutment portion, because this construction accomplishes a favorable balance in the flow of resin in a molding operation. The region of the seal ring having the smaller thickness is not necessarily symmetrical in the right-to-left direction with respect to the position opposed to the abutment portion. The thickness of the seal ring may be changed stepwise or successively. The thickness of the seal ring is adjusted not at the outer peripheral side thereof but at the inner peripheral side thereof. If the thickness of the seal ring is adjusted at the outer peripheral side thereof, it is impossible to keep oil-sealing performance. Thus the seal ring cannot be used.

The region of the seal ring having the smaller thickness may be formed by injection molding or by mechanically processing a conventional seal ring having a constant thickness.

As the configuration of the abutment of the seal ring, straight cut and step cut can be adopted. The step cut is more favorable than the straight cut, because the former is superior to the latter in its oil-sealing performance.

If the region of the seal ring having the smaller thickness is formed symmetrically in the right-to-left direction with respect to the position opposed to the abutment portion, it is preferable to form the gate at the position opposed to the abutment portion or in the neighborhood thereof in injection molding. Thereby a favorable balance can be obtained in the flow of resin in a molding operation and further a high productivity can be obtained because plural production is possible in one shot.

By disposing the gate at the inner peripheral side of the seal ring, the need for performing post-processing can be eliminated.

Although a side gate can be adopted as the form of the gate, a pin gate and a submarine gate are preferable because the pin gate and the submarine gate eliminate the need for performing post-processing.

The present invention is applicable to seal rings of various sizes and particularly effectively applicable to a seal ring having an inner diameter not more than 20 mm because the seal ring whose inner diameter is not more than 20 mm is liable to be broken when it is fitted on a rotary shaft. In the seal ring whose inner diameter is more than 20 mm, a strain is generated to a comparatively low extent at the position opposed to the abutment portion in fitting the seal ring having an inner diameter more than 20 mm on the rotary shaft. Thus the seal ring whose inner diameter is more than 20 mm does not have the problem of breakage.

In addition to the neighborhood of the position opposed to the abutment portion disposed at the center of a molded product, the gate may be disposed in a region having a low extent of strain shown in FIG. 2. That is, the gate may be formed at a position near any one of the abutments spaced by not less than 90 degrees from the position opposed to the abutment portion, supposing that the abutment portion is set to 180 degrees and the position opposed to the abutment portion is set to 0 degree. Which of the two abutments is selected depends on the magnitude of a strain generated thereat.

When the seal ring is small, i.e., when the inner diameter thereof is not more than 20 mm, troubles occur little in a molding operation owing to the difference in the flow length of resin between the left-hand side and right-hand side with respect to the gate. However, a burr is formed owing to the difference in the flow length of the resin between the left-hand side and right-hand side with respect to the gate. Further the amount of the charged resin is short at the side where the flow length thereof is long. In this case, by spacing the gate position at a certain interval from the position opposed to the abutment portion and forming a resin reservoir at the side where the flow length of the charged resin is short, it is possible to prevent an excess resin from flowing to the resin reservoir in the injection molding and prevent an over-charging from occurring at the side where the flow length of charged resin is short. The inlet portion of the resin reservoir is so configured that the resistance to the flow of the resin into the resin reservoir is higher than the resistance to the flow of the resin into the sealing portion. Thus the charging of the resin into the resin reservoir is delayed behind the charging thereof into the sealing portion. Thereby the size of the resin reservoir can be made smaller than the difference between the flow length of the resin into the resin reservoir and that of the resin into the sealing portion. By setting the size of the resin reservoir in such a way that the resin reservoir and the sealing portion are charged simultaneously and completely with the resin, it is possible to suppress generation of a burr formed by over-charging of resin and generation of a molding sink that is generated by shortage of a follow-up pressure.

In the method of producing the seal ring made of resin by spacing the gate position at a certain interval from the position opposed to the abutment portion, molding is so performed that the sealing portion and the resin reservoir portion are simultaneously and completely charged with the resin in an injection molding process. Otherwise, molding is so performed that the sealing portion is completely charged with the resin, whereas the resin reservoir portion is incompletely charged therewith. Thus the seal ring of the present invention is excellent in its mechanical strength and dimensional precision.

Further, the inlet portion of the resin reservoir is so configured that the size of the resin reservoir can be made small. Thus the resin seal ring of the present invention is excellent in easy post-processing and high productivity. And also down-sizing of the rein reservoir makes small seal ring possible to be produced in the diameter not more than 20 mm.

Figure 5:
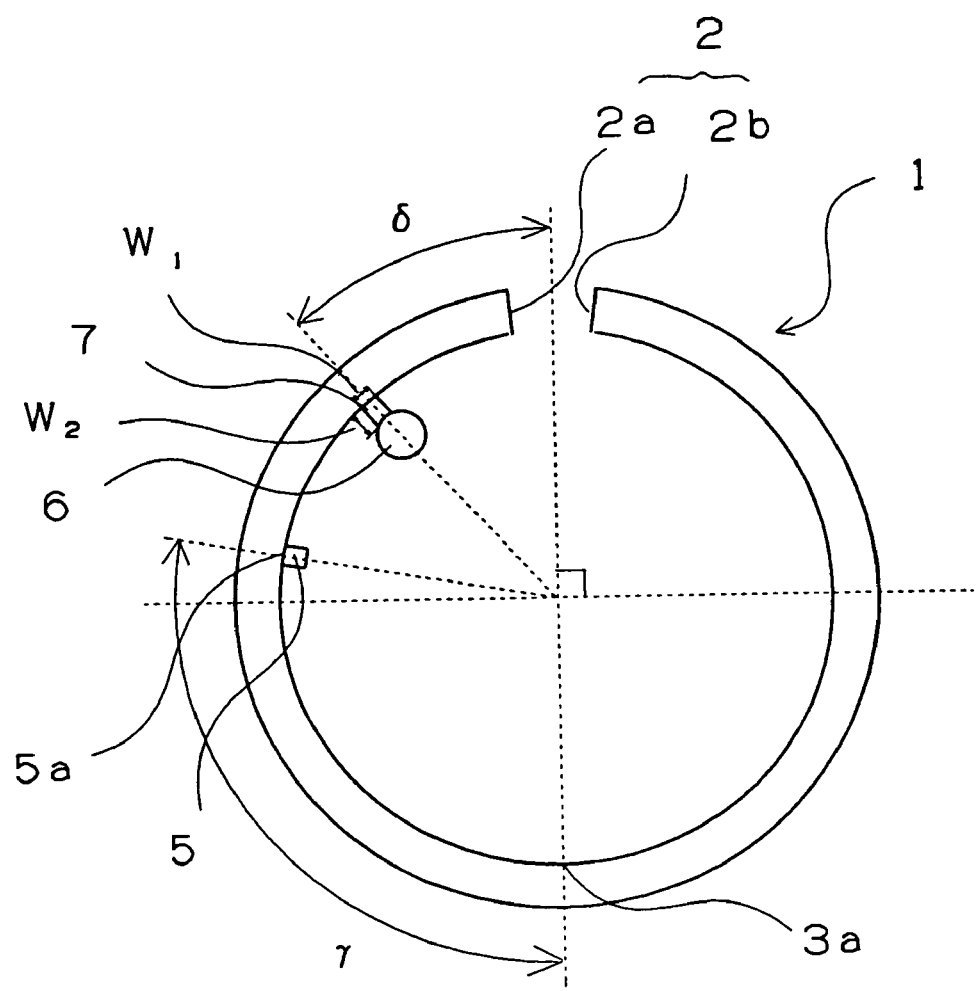
FIG. 5 is a plan view showing one embodiment of the resin seal ring of the present invention.

One example of the seal ring made of resin according to the present invention is described below with reference to FIG. 5. FIG. 5 is a plan view showing the body of a seal ring and the position of a gate and that of a resin reservoir formed in injection molding.

A seal ring 1 has an abutment portion 2 consisting of abutments 2a, 2b confronting each other and a gate mark 5a where the gate was joined with a portion of the seal ring 1, when injection molding was performed. As the configuration of the abutments 2a, 2b, straight cut and step cut can be adopted. The step cut is more favorable than the straight cut because the former is superior to the latter in its oil-sealing performance.

A resin reservoir 6 is formed on the inner peripheral surface of the seal ring 1 between the abutment 2a and the gate mark 5a in the injection molding. The resin reservoir 6 is formed through a resin reservoir inlet portion 7 provided to adjust the amount of resin flowing into the resin reservoir 6.

The gate 5 and the resin reservoir 6 are removed before a finished product of the seal ring 1 is obtained.

As shown in FIG. 2, the strain increases gradually from 0 at 180 degrees to a peak value at about 60 degrees and decreases toward 0 degree. The result shown in FIG. 2 indicates that by forming the gate at a position forming not less than 90 degrees from the position opposed to the abutment portion and favorably not less than 120 degrees therefrom, it is possible to reduce the amount of a strain generated at the gate position and hence greatly improve the fittability of the seal ring on the shaft. It has been found that at a position less than 90 degrees, the fittability can be hardly improved, even though the gate position is shifted from the position 3a opposed to the abutment portion 2 or rather the fittability deteriorates (worst at the position of about 60 degrees).

Based on the above-described knowledge and the examples described later, the angle γ formed between the gate 5 and the position 3a opposed to the abutment portion 2 is set to 90°≦180° and favorably 120°≦γ<150°. If the angle γ is not smaller than 150 degrees, there is a too large difference in the flow length of charged resin between the left-hand side and right-hand side with respect to the gate.

Although the side gate can be adopted as the form of the gate 5, the pin gate and the submarine gate are preferable because the pin gate and the submarine gate eliminate the need for performing post-processing. The gate 5 can be formed at both the inner peripheral side of the seal ring 1 and the peripheral side thereof. But it is preferable to form the gate 5 at the inner peripheral side thereof. Thereby the seal ring 1 has superior oil-sealing performance and the need for performing post-processing can be eliminated.

The resin reservoir 6 is provided to adjust the amount of resin charged from the abutment 2a to the gate mark 5a and the amount of the resin charged from the abutment 2b to the gate mark 5a so that both amounts are approximately equal to each other. Therefore the resin reservoir 6 is formed at a position, between the abutment 2a and the gate mark 5a, where the flow length of the charged resin is short and hence an overcharge of resin occurs. The central angle δ of the seal ring with respect to the position 3a opposed to the abutment portion 2 is not limited to any specific angle, provided that the resin reservoir 6 is disposed at the side where the flow length of the charged resin is short. But preferably the central angle δ is in the range of 0 degree to 90 degrees.

Consequently it is possible to have a favorable balance of a flow rate between the left-hand side and right-hand side with respect to the gate 5 and suppress generation of a burr. Hence the seal ring of the present invention is excellent in its mechanical strength and dimensional precision.

The resin reservoir 6 is set to a size larger than the size which allows the seal ring 1 and the resin reservoir 6 to be simultaneously and completely charged with resin in a follow-up pressure application process (secondary injection process) to be performed subsequently to an injection process (primary injection process). This is because if the resin reservoir 6 is charged completely with the resin faster than the seal ring 1, an unbalanced charging of the resin occurs. Thereby there is a fear that a burr is generated at the side where the flow length of the charged resin is short. Hence there is interference with the oil-sealing performance of the seal ring 1.

The smaller the resin reservoir 6, the more favorable in recycling the seal ring. In the small seal ring having not more than 20 mm in its inner diameter, the space of a die corresponding to the inner peripheral side is very small. Thus it is necessary to make the volume of the resin reservoir small in forming the resin reservoir at the inner peripheral side of the seal ring.

The resin reservoir 6 can be disk-shaped, cubic, rectangular solid-shaped, spherical, and the like. Like the gate 5, the resin reservoir 6 can be formed at both the inner peripheral side of the seal ring 1 and the peripheral side thereof. But it is preferable to form the resin reservoir 6 at the inner peripheral side thereof. Thereby the seal ring 1 has superior oil-sealing performance and the need for performing post-processing can be eliminated.

The inlet portion 7 of the resin reservoir is so configured that the resistance to the flow of resin into the resin reservoir 6 is higher than the resistance to the flow of the resin into the sealing portion in an injection molding operation. The volume necessary for the resin reservoir 6 can be adjusted in dependence on the resistance to the flow of the resin into the inlet portion 7. That is, a volume necessary for the resin reservoir 6 can be reduced by making the resistance to the flow of the resin into the inlet portion 7 large. In the case where the seal ring 1 has a configuration shown in FIG. 5, as the diameter $W_1$ of the inlet port of the resin reservoir becomes smaller and the length $W_2$ of the inlet portion of the resin reservoir becomes larger, the resistance to the flow of the resin into the inlet portion 7 becomes increasingly high, and the volume of the resin reservoir 6 becomes increasingly small. The inlet portion 7 of the resin reservoir is cut off from the seal ring 1 after the injection molding finishes. Thus it is preferable that the inlet portion 7 is formed to have the shape of a pin gate or a submarine gate to facilitate post-processing.

It is known that when the resistance to the flow of the resin into the product portion is too high, a burr is generated on a product. If the resistance to the flow of the resin into the inlet portion 7 is higher than the resistance to the flow of the resin into the product portion, the flow of the resin into the resin reservoir 6 is obstructed and the resistance to the flow of the resin into a product portion is high. Consequently there is a fear that a burr is generated on the product portion. Accordingly, it is preferable that the inlet portion 7 of the resin reservoir is so configured that the resistance to the flow of the resin into the inlet portion 7 satisfy the above-described condition and an equation 1 shown below.

Inflow resistance when burr is generated>Inflow resistance at inlet portion of resin reservoir≧Inflow resistance at sealing portion   Equation 1

The minimum volume of the resin reservoir 6 and the inlet portion 7 of the resin reservoir are determined by injection molding to be performed by using a die having the gate at a desired position (γ>90 degrees) and the resin reservoir 6 formed thereon through the inlet portion 7 having a predetermined configuration and by carrying out the following method.

(1) Molding is performed in an injection condition in which not less than 90% of the seal ring portion is charged with resin in a primary injection process in which a follow-up pressure is not used. Otherwise, the configuration of the inlet portion 7 of the resin reservoir is adjusted in a fixed injection condition to charge not less than 90% of the seal ring portion with resin.

(2) The volume of the resin charged in the resin reservoir 6 is measured when the step (1). The charged volume of the resin reservoir 6 can be simply measured by using the density of the resin from the charged weight of the resin reservoir 6.

(3) A minimum volume (100%) of the resin reservoir 6 is computed, supposing that the volume of the resin reservoir 6 measured in the step (2) is equivalent to 90% of the minimum volume of the resin reservoir 6.

Figure 6:
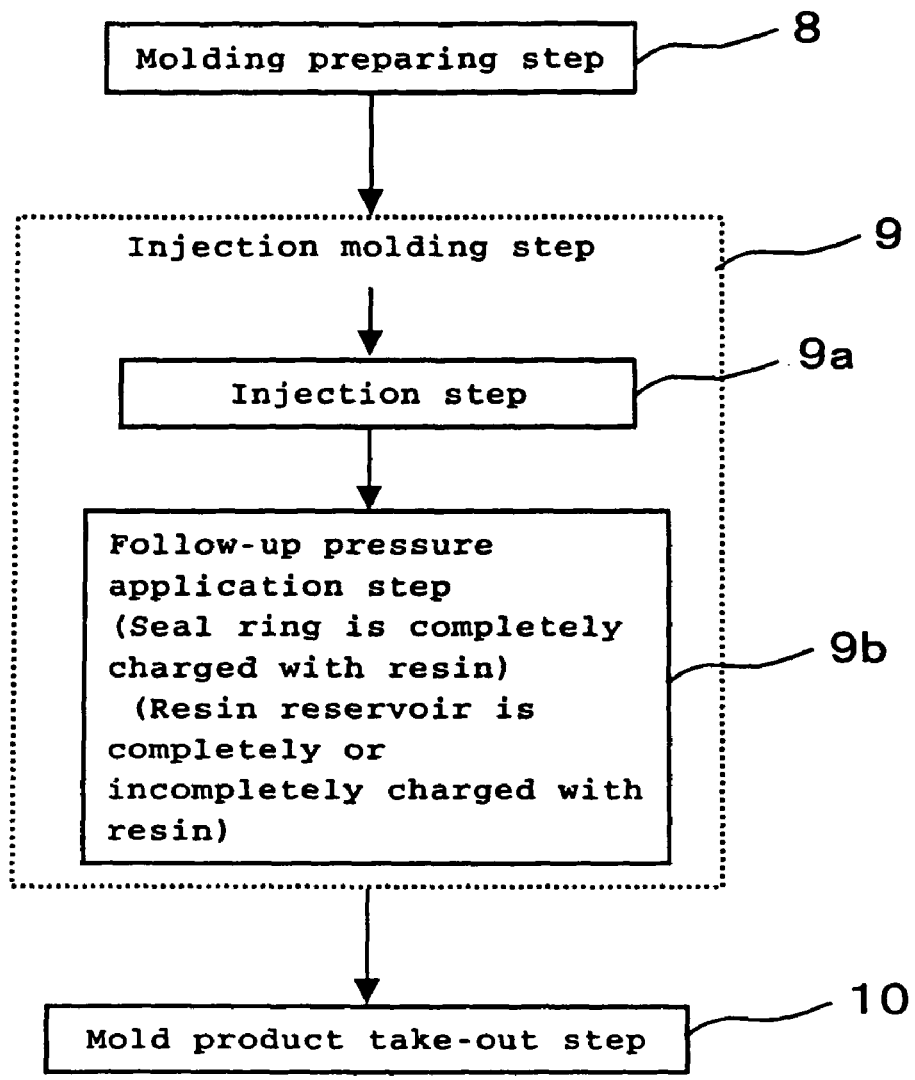
FIG. 6 is a process chart showing the method of manufacturing the resin seal ring of the present invention.

FIG. 6 shows a flowchart of the method of manufacturing the seal ring made of resin of the present invention. The manufacturing method includes a molding preparing step 8, an injection molding step 9, and a molded product take-out step 10. The injection molding step 9 and the molded product take-out step 10 can be carried out by using known processes. For example, as the injection molding step 9, it is possible to use a clamping process of clamping a male die and a female die so that they withstand a pressure in an injection operation.

As the molded product take-out step 10, it is possible to use a process of opening a die at a predetermined speed and further an ejection process of taking out a molded product which has closely adhered to the die, by utilizing a hydraulic pressure or the like.

The injection molding step 9 is the step of performing injection molding by using a die having a resin reservoir, provided through an inlet portion thereof at a position between a gate, for injection molding use, which is spaced at a given interval from the position opposed to an abutment portion and one abutment nearer to the gate than the other abutment in the circumferential distance of the seal ring. In the injection molding step 9, the size of the resin reservoir and the configuration of the inlet portion of the resin reservoir are adjusted to simultaneously and completely charge the sealing portion and the resin reservoir portion with resin; or melted resin is so injected as to charge the sealing portion completely with the resin and charge the resin reservoir portion incompletely with the resin.

More specifically, the injection molding step 9 includes an injection step 9a and a follow-up pressure application step 9b to be performed subsequently to the injection step 9a. In the follow-up pressure application step 9b, the resin of the seal ring is cooled, with the follow-up pressure being applied thereto to completely charge the sealing portion with the resin. In the follow-up pressure application step 9b, melted resin is added as necessary in correspondence to a contracted amount of the resin when the resin is cooled and solidified. After the injection molding step 9 finishes, the molded product take-out step 10 is performed. In this manner, a molded product of the seal ring is obtained.

As described above, the smaller the resin reservoir, the better. Thus it is preferable that when the sealing portion is completely charged with the resin in the follow-up pressure application step 9b, the resin reservoir and the sealing portion are completely and simultaneously charged with the resin.

In the case where the resin reservoir is incompletely charged with the resin when the sealing portion is completely charged therewith, the sealing portion is cooled at a high speed because the width of the sealing portion is short, namely, 2 mm or less. Because the inlet portion of the resin reservoir has a large specific area, the inlet portion is cooled at a high speed and solidified faster than the product portion. Thus the follow-up pressure is uniformly applied to the product portion. Therefore a molding sink is not generated in the product portion.

After the injection molding step 9 finishes, the molded product take-out step 10 is performed to obtain a molded product of the seal ring. Annealing treatment can be conducted on the molded product.

The manufacturing method of the present invention is applicable to seal rings having various sizes and preferably to the production of the seal ring having an inner diameter of not more than 20 mm. This is because in the seal ring having an inner diameter of more than 20 mm, the magnitude of a strain generated by expansion of the inner diameter is comparatively low when the seal ring is fitted on the shaft, even though the seal ring has the gate at the position opposed to the abutment portion. On the other hand, the seal ring having an inner diameter of not more than 20 mm and especially not more than 18 mm has a strain of a high magnitude and is broken while it is being expanded.

It is possible to use a resin material for the seal ring in the present invention, provided that it has heat resistance at temperatures at which the seal ring is used and a sufficient mechanical strength. Thus the following resins can be used: polyarylene sulfide resin such as polyphenylene sulfide (PPS) resin; polyimide resin such as polyether imide resin, polyamide-imide (PAI) resin, thermoplastic polyimide (TPI) resin; aromatic polyester resin such as fully aromatic polyester;

polyamide resin such as nylon 46, nylon 9T; polycyanoaryl ether resin such as polyether nitrile resin; and polyether ketone resin such as polyether ketone (PEK) resin and polyether ether ketone (PEEK) resin. It is possible to use a mixture of these resins, for example, a polymer alloy of the PPS resin and the PAI resin and a composite resin of the PEEK resin and polybenzimidazole resin.

The PEEK resin, the PEK resin, and the TPI resin are most favorable of these resin materials.

It is possible to add the following materials to the resin material: fibrous reinforcing materials such as carbon fiber (CF) and glass fiber; spherical fillers such as spherical silica and spherical carbon; scaly reinforcing materials such as mica and talc; and fine fibrous reinforcing materials such as a whisker of potassium titanate. It is possible to add solid lubricants such as PTFE resin, graphite, and molybdenum disulfide to the resin material. It is possible to add sliding reinforcing materials such as calcium phosphate and calcium sulfide to the resin material. These materials can be added to the resin material singly or in combination. It is possible to conduct annealing treatment such as heat treatment after injection molding is performed to enhance crystallinity index of the seal ring made of the resin material and hence improve heat resistance and mechanical strength thereof.

The seal ring of the present invention is obtained by molding a resin composition containing polyether ketone, selected from among the above-described resin materials, serving as the matrix resin thereof and a predetermined amount of a spherical carbon material, whose main constituent element consists of carbon, added to the matrix resin.

As the polyether ketone resin, PEK resin and PEEK resin having a structure in which aromatic rings are connected with ether groups and ketone groups are available. The PEEK resin is more favorable than the PEK resin because the former is excellent in its heat resistance, mechanical strength, self-lubricity, and flexibility. The tensile elongation of the PEEK resin is not less than 50%.

The chemical formula 1 shows an example of the repeating unit of polyether ketone resin. It is possible to use a copolymer of the repeating unit shown by the chemical formula 1 and the repeating unit shown by the chemical formula 2.

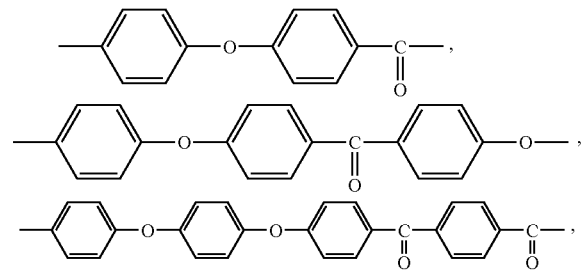

Chemical formula 1

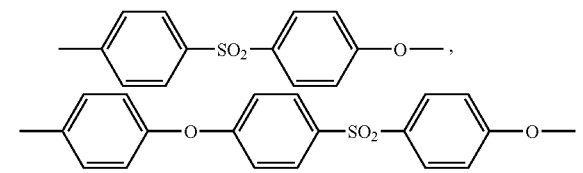

Chemical formula 2

The polyether ketone resins are crystalline. The maximum crystallization percentage of the PEEK resin is as high as 48%. According to the present invention, the following polyether ketone resin are preferable: VICTREX-PEK220G (produced by Victrex Inc.), VICTREX-PEEK150P, 380P, and 450P (all produced by Victrex Inc.), HOSTATEC (produced by Hoechst Inc.), and ULTRA PEK-A1000 (produced by BASF Aktiengesellschaft).

In the polyether ketone resin serving as the matrix resin of the present invention, grades having different molecular weights may be blended. Further resin superior in its heat resistance may be added to the polyether ketone resin, provided that the function of the present invention is not deteriorated thereby.

As the crystalline resin of the above-described other resins, it is possible to use the following resins whose melting points are not less than 250° C.: aromatic polyamides such as tetrafluoroethylene-hexafluoropropylene copolymer (FEP), tetrafluoroethylene-perfluoroalkylvinyl ether copolymer (PFA), ethylene-tetrafluoroethylene copolymer (ETFE), polyamide 66 (PA66), polyamide46 (PA46), aromatic polyamide6 (PA6T), and aromatic polyamide9 (PA9T); aromatic polyesters such as polyethylene terephthalate (PET), and liquid crystal polyester (LCP); polyarylene sulfides (PAS) represented by polyphenylene sulfide (PPS); thermoplastic polyimide (TPI), and polybenzimidazole (PBI).

The spherical carbon materials of the present invention contain carbon as the main constituent element thereof. The preferable spherical carbon materials have a true specific gravity not less than 1.3 and less than 2.0 and are not graphitized much. Carbon black, meso-carbon micro-bead, spherical graphite, and the like having a high graphitization and a true specific gravity not less than 2.0 have cleavage tendency. Thus these graphitized materials do not provide the seal ring with a sufficient wear resistance. The spherical carbon material having a true specific gravity less than 1.3 and carbonized insufficiently has difficulty in displaying its function and hence does not allow the seal ring to have a sufficient wear resistance.

As the spherical carbon material, spherical glass carbon and carbon black having a low extent of aggregation are available.

As the spherical glass carbon, Belpearl C-2000 (produced by Kanebo Inc.) formed by carbonizing spherical phenol resin particles by heat treatment and Nicabeads (produced by Nippon Carbon Inc.) are available. As the carbon black having a low extent of aggregation, carbon black #3030B (produced by Mitsubishi Chemical Corp.) produced by using oil furnace method is available.

Supposing that the addition amount of the spherical carbon material is $V_2$ (volume %) and that the average particle diameter of the spherical carbon material is d (Mm), the spherical carbon material is used in such a way as to satisfy the following equation 2.

$$0.76 \ln d + 5.7 < V_2 < 1.27 \ln d + 11.2$$

$$0.03 < d \leq 50 \qquad \text{Equation 2}$$

The equation 2 was determined based on results of the inner diameter expansion test and the frictional wear test, described later in "examples of the present invention", which were conducted on seal rings obtained by injection-molding a resin composition for lubricants in oil containing the spherical carbon material essentially. The left side of the equation 2 was obtained from the relationship between the particle diameter of the spherical carbon material as well as its mixing amount and the wear resistance of the seal ring based on the frictional wear test. The right side of the equation 2 was obtained from the relationship between the particle diameter of the spherical carbon material as well as its mixing amount and the flexibility of the seal ring based on the inner diameter expansion test.

When the mixing amount $V_2$ of the spherical carbon material is not more than the value of the left side of the equation 2, it is impossible to obtain a sufficient wear resistance demanded for the seal ring. Further because the amount of additives is small, a molding sink or a burr tends to be generated. Thereby it is necessary to perform post-processing of treating the burr and hence there is a possibility that the seal ring is incapable of satisfying oil-sealing performance.

When the mixing amount $V_2$ of the spherical carbon material is more than the value of the right side of the equation 2, it is not sufficiently flexible. The seal ring may be broken in fitting the seal ring on the shaft. In the case where spherical particles having an average diameter d not more than 0.1 μm are used, they are thickened to a very high extent. Thus it is very difficult to mold the resin material for the seal ring or there is a possibility that the resin material cannot be molded.

The average diameter d of the spherical particle is set to favorably not less than 0.03 μm and less than 50 μm and more favorably not less than 0.04 μm nor more than 30 μm. If the average diameter d of the spherical particle is less than 0.03 μm or not less than 50 μm, wear resistance of the seal ring may be unstable. Particles whose average diameter d is less than 0.03 μm have a very strong cohesion. Thus they are incapable of making a stable uniform dispersion. On the other hand, particles whose average diameter d is not less than 50 μm are too large for the unit of wear. Thus they are incapable of imparting a uniform wear resistance to the seal ring.

The following molding method may be carried out to obtain the seal ring: after materials such as the resin composition for lubricants in oil, and the spherical carbon material for the seal ring are mixed with one another by a mixer such as a Henschel mixer, a tumbler mixer, a ball mixer, a ribbon blender, a Loedige mixer, the components are meltingly kneaded by a biaxial kneader or a mono-axial kneader to form a pellet. Thereafter the pellet is injection-molded by a conventional injection molding method. It is possible to conduct annealing treatment such as heat treatment after the injection molding is performed to enhance crystallinity index of the seal ring and thus improve its heat resistance and mechanical strength thereof.

The following additives may be added to the resin material in addition to the spherical carbon material: inorganic additives such as carbon fiber, glass fiber, ceramic fiber, glass beads, glass balloon, mica; solid lubricants such as graphite, PTFE resin, and molybdenum disulfide; thermal conductivity-imparting materials such as metal oxides and metal fibers; release agents, thermal stability-improving materials; various whiskers; and thermosetting resin. These materials can be added to the resin material singly or in combination. Surface treatment such as coupling treatment may be made on these additives. The PTFE resin shows releasability from a die in injection molding and is a preferable additive.

Side feeding may be adopted when these additives and the resin material are kneaded by a biaxial kneader.

The gate position is not limited to a specific position in producing the seal ring of the present invention by injection molding. But it is preferable to dispose the gate position at the inner peripheral side of the seal ring. Thereby it is possible to secure oil-sealing performance and eliminate the need for performing post-processing operation. It is also preferable to dispose the gate in the neighborhood of the portion opposed to the abutment portion in consideration of a favorable balance in the flow of resin in injection molding. Supposing that the angle of the abutment portion of the seal ring consisting of abutments confronting each other is 180 degrees and the angle of the portion opposed to the abutment portion is 0 degree, it is preferable to dispose the gate in the range of 0 degree to ±15 degrees at the inner diameter side of the seal ring.

As the configuration of the abutment, it is possible to adopt any desired configurations such as straight cut, angle cut, step cut, and the like. The step cut is most favorable because the step cut allows the seal ring to have superior oil-sealing performance.

Examples 1 through 4 and Comparison Examples 1 through 4

15 wt % of carbon fiber (CF) (HTA-CMF-0160-OH produced by Toho Rayon Inc.) and 15 wt % of PTFE KTL-610 produced by Kitamura Inc. were added to 70 wt % of PEEK resin (PEEK 150P produced by Victrex Inc.). After these components were mixed with one another by using a Henschel mixer, resin pelletized by using a biaxial kneader was used as the material, for the seal ring, to be injection-molded.

A die configured as shown in table 1 was prepared. Using the die, the material was injection-molded to obtain a seal ring whose thin portions are symmetrical with respect to the position opposed to the abutment portion shown in FIG. 3A. The diameter of the gate of each of the examples and the comparison examples was set to 0.6 mm.

Whether each seal ring passed the examination was evaluated by measuring the expansion amount of the inner diameter thereof by using a tapered jig having a length of 30 cm, a diameter of 11 mm at a smaller-diameter side thereof, and a diameter of 17.5 mm at a larger-diameter side thereof. The seal ring was fitted on the tapered jig from the small-diameter side. When the seal ring was broken or cracked, the inner diameter of the seal ring was measured. In the process of fitting seal rings on shafts respectively in mass production, a seal ring having an outer diameter of 15 mm cannot be frequently fitted on a shaft when the expansion amount of the inner diameter of the seal ring is less than 15.3 mm. Therefore the seal ring in which the expansion amount of the inner diameter was not less than 15.4 mm was marked by "G" (means "good", same as below "G"), whereas the seal ring in which the expansion amount of the inner diameter was not more than 15.4 mm was marked by "NG (means "not good", same as below "NG")". Table 1 shows the result. In table 1, "normal thickness" indicates $t_1$ shown in FIG. 3B, and "thickness of thin portion" indicates $t_2$ shown in FIG. 3B.

TABLE 1

|  | Example | | | | Comparison example | | | |
| --- | --- | --- | --- | --- | --- | --- | --- | --- |
|  | 1 | 2 | 3 | 4 | 1 | 2 | 3 | 4 |
| Outer diameter, mm | 15 | 15 | 15 | 15 | 15 | 15 | 15 | 15 |
| Thickness of normal portion, mm | 1.65 | 1.65 | 1.65 | 1.65 | 1.65 | 1.65 | 1.65 | 1.65 |
| Angle of thin portion, degree | 8-128 | 25-160 | 15-100 | 8-30 | none | 90-146 | 16-113 | 50-70 |
| Thickness of thin portion, mm | 1.3 | 1.3 | 1.3 | 1.3 | none | 1.3 | 1.6 | 1.3 |

TABLE 1-continued

|  | Example | | | | Comparison example | | | |
| --- | --- | --- | --- | --- | --- | --- | --- | --- |
|  | 1 | 2 | 3 | 4 | 1 | 2 | 3 | 4 |
| Expanded diameter, mm | not less than 17.5 | not less than 17.5 | 17.3 | 15.6 | 14.5 | 14.5 | 15.1 | 14.6 |
| Success or failure | G | G | G | G | NG | NG | NG | NG |

As shown in table 1, the seal ring of each example was not broken when the expanded inner diameter thereof reached 15.4 mm.

According to the resin seal ring of the present invention, when the inner diameter of said seal ring is expanded, the thickness of the region in which a strain is generated in a higher magnitude than a strain generated at said gate position is set smaller than that of the gate position. Therefore the seal ring can be prevented from being broken when it is fitted on a rotary shaft. Particularly, the seal ring whose inner diameter is not more than 20 mm can be prevented from being broken when it is fitted on the rotary shaft. Therefore it is possible to improve productivity in the process of fitting the seal ring on the rotary shaft.

Furthermore since it is possible to dispose the gate at the position opposed to the abutment portion and design the seal ring in such a way that the configuration thereof is symmetrical in the right-to-left direction with respect to the gate. Therefore an unbalanced charging of the resin can be avoided in the molding process. Further a weld portion is not generated. Therefore the seal ring is excellent in its quality and productivity.

Examples 5 through 8 and Comparison Examples 5 through 7

The resin material of each of the examples 5 through 8 and the comparison examples 5 through 7 was prepared by adding 15 wt % of carbon fiber HTA-CMF-0160-OH (produced by Toho Rayon Inc.) and 15 wt % of PTFE KTL-610 (produced by Kitamura Inc.) to 70 wt % of PPEK 150P (produced by Victrex Inc.). After these materials were mixed with one another by using a Henschel mixer, the mixture pelletized at 360° C. by using a biaxial kneader was injection-molded at a resin temperature of 380° C. and a die temperature of 180° C.

The seal ring die used in the examples and the comparison examples was provided with a resin reservoir. The outer diameter of the die was 15 mm. The gate position could be disposed at any desired positions of the inner peripheral side. A telescopic construction was adopted for the resin reservoir to alter the volume thereof. The position of the resin reservoir was fixed to a position of $\delta=20$ degrees. Molding operation was performed by changing the gate position $\gamma$, the diameter $W_1$ of the inlet port of the resin reservoir, the length $W_2$ of the inlet portion of the resin reservoir, and the volume $V_1$ of the resin reservoir.

After the molded portion of the resin reservoir was removed from the seal ring by processing, annealing treatment was conducted in predetermined conditions.

Whether or not a burr or a molding sink was generated in the product portion was checked to evaluate the moldability of each seal ring. To evaluate the fittability of each seal ring on the shaft, the expansion amount of the inner diameter thereof was measured by using a tapered jig having a length of 30 cm, a diameter of 11 mm at a smaller-diameter side thereof, a diameter of 17.5 mm at a larger-diameter side thereof.

The seal ring which had a burr or a molding sink generated thereon was marked by "NG", whereas the seal ring which had no problems in terms of molding was marked by "G".

To measure the expansion amount of the inner diameter, the seal ring was fitted on the tapered jig from the small-diameter side of the tapered jig. When the seal ring was broken or cracked, the inner diameter of the seal ring was measured.

As the general judgement, the seal ring in which the total of the initial inner diameter of the seal ring and the expanded amount thereof was not less than 15.4 mm was marked by "G", whereas the seal ring in which the total of the initial inner diameter of the seal ring and the expanded amount thereof was not more than 15.4 mm was marked by "NG". In fitting the seal ring on the shaft, the seal ring is expanded more than the outer diameter thereof. Thus as the standard by which the expansion amount of the inner diameter is judged, 15 mm equal to the outer diameter of the seal ring was adopted. Table 2 shows the result of the evaluation.

TABLE 2

|  | Example | | | | Comparison example | | |
| --- | --- | --- | --- | --- | --- | --- | --- |
|  | 5 | 6 | 7 | 8 | 5 | 6 | 7 |
| Gate position α, degree | 100 | 120 | 120 | 140 | 0 | 60 | 120 |
| Diameter of inlet port of resin reservoir $W_1$, mm | 0.6 | 0.4 | 0.4 | 0.3 | — | 0.6 | 0.4 |
| Length of inlet portion of resin reservoir $W_2$, mm | 3 | 3 | 5 | 3 | — | 3 | 3 |
| Optimum volume of resin reservoir, mm³ | 22 | 6 | 3 | 2 | — | 13 | 6 |
| Volume of resin reservoir actually used, mm³ | 22 | 6 | 4 | 4 | — | 13 | 2 |
| Moldability | G | G | G | G | G | G | NG |
| Expanded inner diameter, mm | 15.4 | 16.7 | 16.7 | more than 17.5 | 14.4 | 13.5 | 16.7 |
| General judgement | G | G | G | G | NG | NG | NG |

In the examples 5 through 8, the gate position was far from the position opposed to the abutments. The seal ring of each of the examples 5 and 6 was formed by using a die provided with a resin reservoir having a minimum volume. The seal ring of each of the examples 7 and 8 was formed by using a die provided with a resin reservoir having a larger volume. Therefore the seal ring of each of the examples 5 through 8 was excellent in the moldability and the expansion amount of the inner diameter thereof. Further the expansion amount of the inner diameter of the seal ring of each of the examples 5 through 8 was improved much more than that of the seal ring of the comparison example 5 formed by using a die having a conventional configuration.

The seal ring of the comparison example 5 was formed by using a conventional resin reservoir-unprovided die having the gate position disposed at the position opposed to the abutments. There was no problem on the moldability but the total of the initial inner diameter of the seal ring and the expanded amount thereof was 14.4 mm. Thus the seal ring was evaluated as "NG".

The gate of the seal ring of the comparison example 6 was disposed at the position indicated by γ=60 degrees. The volume of the resin reservoir was minimum. There was no problem on the moldability but the expansion amount of the inner diameter of the seal ring was short. Thus the seal ring was evaluated as "NG".

The gate of the seal ring of the comparison example 7 was disposed at the position indicated by γ=120 degrees. The volume of the resin reservoir was ⅓ of the minimum volume. Thus the resin reservoir was completely charged with resin in the injection process (primary injection process). When the injection molding finished, the resin adhered to the die and a burr was observed. Thus there was no problem on the expansion amount of the inner diameter of the seal ring, but the seal ring was evaluated as "NG".

The present invention is applicable to seal rings of various sizes and particularly effectively applicable to a seal ring having an inner diameter not more than 20 mm because the seal ring whose inner diameter is not more than 20 mm is liable to be broken when it is fitted on a rotary shaft.

The materials used in the examples 9 through 14 and the comparison examples 8 through 16 are shown below. The parenthesized characters denote abbreviations shown in tables 3 though 5.

(1) Aromatic polyether ether ketone resin [PEEK1]
PEEK150P produced by Victrex Inc.

(2) Aromatic polyether ether ketone resin [PEEK2]
PEEK450P produced by Victrex Inc.

(3) PTFE resin [PTFE]
KT-620 produced by Kitamura Inc.

(4) Spherical carbon material (carbon black) [CB1]
3030B produced by Mitsubishi Kagaku Inc. (true specific gravity: 1.7 to 1.9, configuration: spherical, average diameter: 55 nm)

(5) Spherical carbon material (micro-carbon beads) [CB2], MC-0520 produced by Nippon Carbon Inc. (true specific gravity: 1.37 to 1.39, configuration: spherical, average diameter: 5 μm)

(6) Spherical carbon material (spherical amorphous carbon) [CB3], Pelpearl C-2000 produced by Kanebo Inc. (true specific gravity: 1.5 to 1.6, configuration: spherical, average diameter: 2 μm)

(7) Graphite material (meso-carbon micro-bead) [GB1], MCMB-6-2800 produced by Osaka Gas Inc. (true specific gravity: 2.1 to 2.2, configuration: spherical, average diameter: 6 μm)

(8) Spherical graphite material [GB1], LB-CG produced by Nippon Graphite Inc. (true specific gravity: 2.23 to 2.25, configuration: pseudo-spherical, average diameter: 20 μm)

(9) PAN carbon fiber (CF), Besphite HTA-CMF0160-OH (length of fiber: 0.16 mm, diameter of fiber: 7 μm)

The materials were measured at the rates shown in tables 4 and 5 and mixed with one another by using a Henschel mixer. After the mixture was pelletized at 360° C. by using a biaxial kneader, the pellet was injection-molded at a resin temperature of 380° C. and a die temperature of 180° C. to obtain each seal ring. As shown in FIG. 7, each seal ring 1 had a gate mark 5a at a position opposed to the abutment 2.

The addition amount of each of the spherical filler shown in the examples 9 through 14 shown in table 4 was in the addable range based on the equation 2 previously described. Table 3 shows the addable amount of each spherical filler.

TABLE 3

| | Average diameter d, μm | Lower limit of mixing amount, volume % | Upper limit of mixing amount, volume % |
|---|---|---|---|
| CB1 | 0.055 | 3.5 | 7.5 |
| CB2 | 5 | 6.9 | 13.2 |
| CB3 | 20 | 8.0 | 15.0 |
| GB1 | 6 | 7.1 | 13.5 |
| GB2 | 20 | 8.0 | 15.0 |

TABLE 4

| Component, | Example | | | | | |
|---|---|---|---|---|---|---|
| volume % | 9 | 10 | 11 | 12 | 13 | 14 |
| Matrix | | | | | | |
| PEEK1 | 96 | 92.5 | 87.5 | 90 | 87.5 | 67 |
| PEEK2 | — | — | — | — | — | 22 |
| Additive | | | | | | |
| CB1 | 4 | — | — | — | — | 6 |
| CB2 | — | 7.5 | 12.5 | — | — | — |
| CB3 | — | — | — | 10 | 12.5 | — |
| GB1 | — | — | — | — | — | — |
| GB2 | — | — | — | — | — | — |
| CF | — | — | — | — | — | — |
| PTFE | — | — | — | — | — | 5 |

TABLE 5

| Component, | Comparison example | | | | | | | | |
|---|---|---|---|---|---|---|---|---|---|
| volume % | 8 | 9 | 10 | 11 | 12 | 13 | 14 | 15 | 16 |
| Matrix | | | | | | | | | |
| PEEK1 | 75 | 98 | 90 | 95 | 82.5 | 95 | 80 | 90 | 90 |
| PEEK2 | — | — | — | — | — | — | — | — | — |
| Additive | | | | | | | | | |
| CB1 | — | 2 | 10 | — | — | — | — | — | — |
| CB2 | — | — | — | 5 | 17.5 | — | — | — | — |
| CB3 | — | — | — | — | — | 5 | 20 | — | — |
| GB1 | — | — | — | — | — | — | — | 10 | — |
| GB2 | — | — | — | — | — | — | — | — | 10 |
| CF | 10 | — | — | — | — | — | — | — | — |
| PTFE | 15 | — | — | — | — | — | — | — | — |

Figure 8:
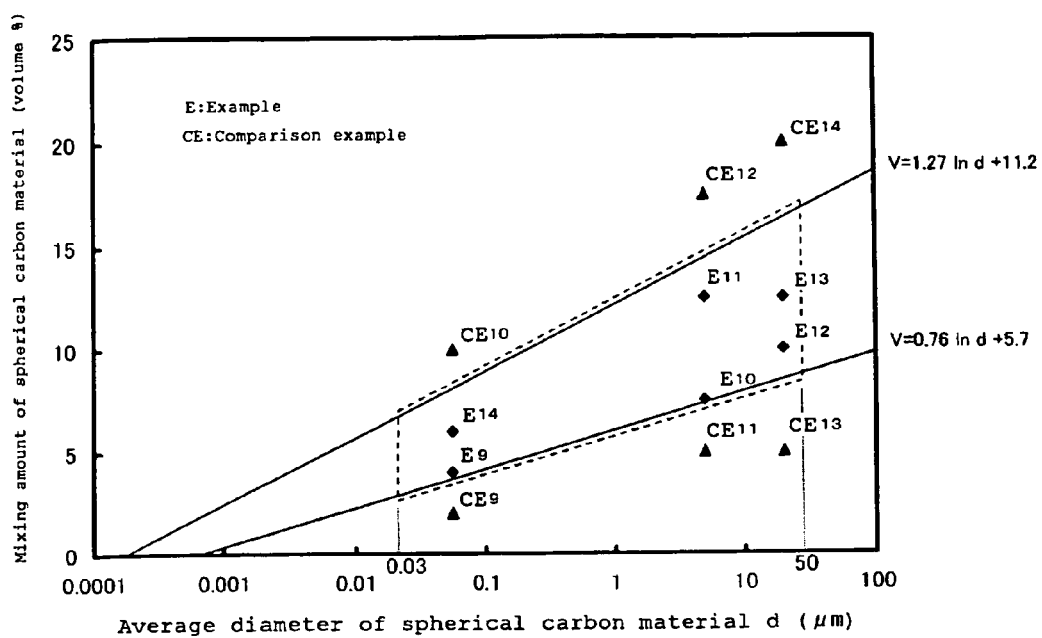
FIG. 8 is a graph showing the relationship between an average particle diameter (μm) of a spherical carbon material and a mixing amount (volume %) thereof.

The inner diameter expansion test and the frictional wear test described below were conducted on the seal ring of each of the examples and the comparison examples Tables 6 and 7 show the results and general evaluation of each test. FIG. 8 shows the relationship between the average particle diameter (μm) of the spherical carbon material added to the resinous material of the examples 9 through 14 and the comparison examples 9 through 14 and the mixing amount (volume %)

thereof. In FIG. 8, the abscissa shows the average particle diameter (μm) of the spherical carbon material, and the ordinate shows the mixing amount (volume %) $V_2$ thereof.

Test for Examining Expansion of Inner Diameter

This test was conducted to evaluate the resistance of the seal ring to breakage when the seal ring is fitted on the rotary shaft. In the test, a tapered jig having a length of 30 cm, a diameter of 11 mm at the smaller-diameter side thereof, and a diameter of 17.5 mm at the larger-diameter side thereof. A seal ring specimen was fitted on the tapered jig from the small-diameter side to expand the inner diameter thereof. When the seal ring specimen was broken or cracked, the inner diameter of the seal ring was measured. The seal ring in which the total of the initial inner diameter of the seal ring and the expanded amount was not less than 15.4 mm was evaluated as "G", whereas the seal ring in which the total of the initial inner diameter of the seal ring and the expanded amount thereof was not more than 15.4 mm was evaluated as "NG". In fitting the seal ring on a shaft, the seal ring is required to be expanded more than the outer diameter thereof. Therefore as the standard by which the expansion amount of the inner diameter is judged, 15.4 mm equal to the outer diameter of the seal ring was adopted.

Test for Examining Frictional Wear

To evaluate the wear resistance, an in-oil frictional wear test was conducted by using a ring specimen, which is made of resin composition of the seal ring, having an outer diameter of 21 mm, an inner diameter of 17 mm, and a height of 3 mm and a ring-on-disk tester. The test was conducted in oil for five hours and an atmospheric temperature of 100° C. by using a mating member, disk made of steel, rotating at a speed of 64 m/minute and having a surface pressure of 5.5 MPa and a surface roughness of not less than Ra 0.8 μm. The oil used in the test was automatic transmission oil (ATF: Dexyron 2 produced by Showa Shell Inc.) The dynamic friction coefficient and the worn volume were measured. The wear resistance was evaluated by the worn volume. The worn volume (condition of this test) of the seal ring of the comparison example 8 composed of PEEK resin known as a sealing composition containing carbon fiber and PTFE which is a solid lubricant was used as the reference in making judgement. The seal ring having a worn volume less than 5 mm³ was evaluated as "G", whereas the seal ring having a worn volume not less than 5 mm³ was evaluated as "NG".

As the judgement of the general evaluation, the seal ring evaluated as "G" in both the test of examining the expansion of the inner diameter thereof and the test for examining the frictional wear thereof was marked by "G", whereas the seal ring evaluated as "NG" in either the test of examining the expansion of the inner diameter thereof or the test for examining the frictional wear thereof was marked by "NG".

TABLE 6

| | Example | | | | | |
|---|---|---|---|---|---|---|
| | 9 | 10 | 11 | 12 | 13 | 14 |
| Inner diameter expansion test | | | | | | |
| Expanded diameter, mm | 15.93 | 16.89 | 16.01 | 16.52 | 15.88 | 16.76 |
| Evaluation | G | G | G | G | G | G |
| Frictional wear test | | | | | | |
| Dynamic friction coefficient | 0.07 | 0.07 | 0.06 | 0.07 | 0.08 | 0.06 |
| Worn volume, mm³ | 3.1 | 3.8 | 3.6 | 3.7 | 3.7 | 2.8 |
| Evaluation | G | G | G | G | G | G |
| General evaluation | G | G | G | G | G | G |

TABLE 7

| | Comparison example | | | | | | | | |
|---|---|---|---|---|---|---|---|---|---|
| | 8 | 9 | 10 | 11 | 12 | 13 | 14 | 15 | 16 |
| Inner diameter expansion test | | | | | | | | | |
| Expanded diameter, mm | 14.46 | more than 17.5 | 12.89 | more than 17.5 | 14.32 | more than 17.5 | 14.13 | 15.91 | 16.52 |
| Evaluation | NG | G | NG | G | NG | G | NG | G | G |
| Frictional wear test | | | | | | | | | |
| Dynamic friction coefficient | 0.15 | 0.12 | 0.06 | 0.10 | 0.08 | 0.08 | 0.06 | 0.07 | 0.07 |
| Worn volume, mm³ | 3.0 | 35.8 | 2.7 | 31.4 | 3.3 | 34.2 | 3.0 | 7.9 | 11.6 |
| Evaluation | G | NG | G | NG | G | NG | NG | NG | NG |
| General evaluation | NG | NG | NG | NG | NG | NG | NG | NG | NG |

As the spherical carbon material of the seal ring of the example 9, carbon black having a low extent of aggregation of particles whose average diameter is 55 nm was used in the mixing range specified in the present invention. The spherical carbon material had excellent flexibility and wear resistance. Thus the seal ring was marked by "G" in the general evaluation. The dynamic friction coefficient of the seal ring was much lower than that of the seal ring of the comparison example 8 containing the PEEK resin known as a sealing composition. This is because a preferable sliding state could be formed owing to excellent oil-maintaining performance of carbon displayed in the sliding portion.

As the spherical carbon material of the seal ring of the examples 10 and 11, micro-carbon beads having an average particle diameter of 5 μm was used in the mixing range specified in the present invention. The particle diameter of the spherical carbon material was much different from that of the example 9. The seal ring of each of comparison examples 10 and 11 had also excellent flexibility and wear resistance. Thus the seal rings were marked by "G" in the general evaluation. Like the seal ring of the example 9, the dynamic friction coefficient of each seal ring was also low.

As the spherical carbon material of the seal ring of the examples 12 and 13, amorphous carbon having an average particle diameter of 20 μm was used in the mixing range specified in the present invention. The particle diameter of the spherical carbon material was largest of those of the spherical carbon materials of all the examples. The seal ring of each of examples 12 and 13 had also excellent flexibility and wear resistance. Thus the seal rings were marked by "G" in the general evaluation. Like the seal ring of the other examples, the dynamic friction coefficient of each seal ring was also low.

The seal ring of the example 14 was composed of a mixture of two kinds of PEEK resins having different grades. As the spherical carbon material of the seal ring, the same spherical carbon material as that of the example 9 was added to the mixture of the PEEK in the mixing range specified in the present invention. The composition of the seal ring also contained a small amount of PTFE as the release agent. The composition displayed the effect of the present invention. The seal ring of the example 14 had also excellent flexibility and wear resistance. Thus the seal rings were marked by "G" in the general evaluation. The dynamic friction coefficient of the seal ring was also low.

The seal ring of the comparison example 8 contained PEEK known composition known as a sealing composition. Although the seal ring had superior wear resistance, it had inferior flexibility. Thus the seal ring was evaluated as "NG" in the test of examining the expansion of the inner diameter thereof. Therefore seal ring was evaluated as "NG" in the general evaluation. The dynamic friction coefficient of the seal ring was 0.15 which was highest.

As compared with the seal ring of the examples 9 and 14, the composition of the seal ring of the comparison example 9 contained the spherical carbon material in an amount smaller than that the mixing range specified in the present invention. Because the seal ring had superior flexibility, the seal ring was evaluated as "G" in the test of examining the expansion of the inner diameter thereof. Since the composition of the seal ring did not contain a predetermined amount of the spherical carbon material, a sufficient wear resistance was not imparted to the seal ring. Therefore seal ring was evaluated as "NG" in the test for examining the frictional wear thereof and evaluated as "NG" in the general evaluation.

As compared with the seal ring of the examples 9 and 14, the composition of the seal ring of the comparison example 10 contained the spherical carbon material in an amount larger than that the mixing range specified in the present invention. The seal ring had inferior flexibility. Thus the seal ring was evaluated as "NG" in the test of examining the expansion of the inner diameter thereof. Although the seal ring had superior wear resistance, it was evaluated as "NG" in the general evaluation. The dynamic friction coefficient was low.

As compared with the seal ring of the examples 10 and 11, the composition of the seal ring of the comparison example 11 contained the spherical carbon material in an amount smaller than that the mixing range specified in the present invention. Because the seal ring had superior flexibility, the seal ring was evaluated as "G" in the test of examining the expansion of the inner diameter thereof. Since the composition of the seal ring did not contain a predetermined amount of the spherical carbon material, a sufficient wear resistance was not imparted to the seal ring. Therefore seal ring was evaluated as "NG" in the test for examining the frictional wear thereof and evaluated as "NG" in the general evaluation.

As compared with the seal ring of the examples 10 and 11, the composition of the seal ring of the comparison example 12 contained the spherical carbon material in an amount larger than that the mixing range specified in the present invention. The seal ring had inferior flexibility. Thus the seal ring was evaluated as "NG" (means "not good", same as below "NG") in the test of examining the expansion of the inner diameter thereof. Although the seal ring had superior wear resistance, it was evaluated as "NG" in the general evaluation. The dynamic friction coefficient was low.

As compared with the seal ring of the examples 12 and 13, the composition of the seal ring of the comparison example 13 contained the spherical carbon material in an amount smaller than that the mixing range specified in the present invention. Because the seal ring had superior flexibility, the seal ring was evaluated as "G" in the test of examining the expansion of the inner diameter thereof. Since the composition of the seal ring did not contain a predetermined amount of the spherical carbon material, a sufficient wear resistance was not imparted to the seal ring. Therefore seal ring was evaluated as "NG" in the test for examining the frictional wear thereof and evaluated as "NG" in the general evaluation.

As compared with the seal ring of the examples 12 and 13, the composition of the seal ring of the comparison example 14 contained the spherical carbon material in an amount larger than that the mixing range specified in the present invention. The seal ring had inferior flexibility. Thus the seal ring was evaluated as "NG" in the test of examining the expansion of the inner diameter thereof. Although the seal ring had superior wear resistance, it was evaluated as "NG" in the general evaluation. The dynamic friction coefficient was low.

In the seal ring of the comparison example 15, the spherical carbon material of the example 12 was replaced with high crystalline meso-carbon micro-bead having a high graphitization. The mixing amount of the meso-carbon micro-bead was equal to that of the additive of the example 12. Thus the mixing amount thereof was within the mixing range specified in the present invention. The seal ring had inferior wear resistance because the additive having a high graphitization was used. Although the seal ring had superior flexibility, it was evaluated as "NG" in the general evaluation. The dynamic friction coefficient was low.

In the seal ring of the comparison example 16, the spherical carbon material of the example 12 was replaced with natural graphite spherically treated. The mixing amount of the natural graphite was equal to that of the additive of the example 12. Thus the mixing amount thereof was within the mixing range specified in the present invention. Like the seal ring of the comparison example 15, the seal ring had inferior wear resistance because the additive having a high graphitization was used. Although the seal ring had superior flexibility, it was evaluated as "NG" in the general evaluation. The dynamic friction coefficient was low.

The range, shown by the equation 2, surrounded with the one-dot chain line of FIG. 8 was found from the results of the examples. By using the equation 2, it is possible to estimate the mixing amount (volume %) of the spherical carbon material having the degree of wear resistance and flexibility demanded for the seal ring from the average particle diameter ($\mu$m) of the spherical carbon material which is used as the additive.

The resin seal ring of the present invention can be suitably utilized as an oil seal ring for use in a hydraulic mechanism of a vehicle and the like.

What is claimed is:
1. A resin seal ring comprising abutments confronting each other and a mark of a gate formed in an injection molding operation at a position spaced at a certain interval from position opposed to said abutments abutting each other, wherein said mark of said gate is present in a range of not less than 90 degrees and less than 150 degrees in a central angle of said seal ring with respect to said position opposed to said abutments, supposing that an angle of said position opposed to said abutments is 0 degrees,
wherein said resin seal ring is formed by injection molding using a die, said die having a resin reservoir provided between said gate forming said gate mark and one abutment nearer to said gate forming said mark than another abutment in a circumferential distance of said seal ring through a resin reservoir inlet portion,
wherein said resin seal ring has a mark of said resin reservoir inlet portion, wherein said mark of said resin reservoir inlet portion is between said mark of said gate and one of said abutments,
wherein said inlet portion of said resin reservoir is configured so that a resistance to a flow of a resin into said resin reservoir is not lower than a resistance to a flow of said resin into a sealing portion in an injection molding operation; and a size of said resin reservoir is not smaller than a size that makes said resin reservoir and said sealing portion possible to be charged simultaneously and completely with said resin in said injection molding operation, wherein said resin reservoir is provided at an inner diameter side of said seal ring; said mark of said resin reservoir inlet portion being located at said inner diameter side of said seal ring.

2. A seal ring according to claim 1, wherein an inlet portion of a resin reservoir is configured so that a resistance to a flow of a resin into said resin reservoir is not lower than a resistance to a flow of said resin into a sealing portion in an injection molding operation and is pin gate-shaped or submarine gate-shaped.

3. A seal ring according to claim 1, wherein an inner diameter of said seal ring is not more than 20 mm.

4. A seal ring according to claim 1, wherein a resin material of said seal ring consists of one resin selected form among polyether ether ketone, polyether ketone, and thermoplastic polyimide.

5. A seal ring according to claim 1, wherein said gate mark is present in a range of not less than 120 degrees and less than 150 degrees in a central angle of said seal ring with respect to said position opposed to said abutments, supposing that an angle of said position opposed to said abutments is 0 degree.

6. A seal ring according to claim 1, wherein said inlet portion of said resin reservoir is configured so that a resistance to a flow of a resin therein to satisfy an equation 1 shown below:

Inflow resistance is generated when a burr is generated>Inflow resistance at inlet portion of resin reservoir≧Inflow resistance at sealing portion.   Equation 1

* * * * *